US006984902B1

(12) United States Patent
Huang et al.

(10) Patent No.: US 6,984,902 B1
(45) Date of Patent: Jan. 10, 2006

(54) HIGH EFFICIENCY VIBRATION ENERGY HARVESTER

(75) Inventors: Jiankang Huang, Roslindale, MA (US); Robert C. O'Handley, Andover, MA (US); David Bono, Wellesley, MA (US)

(73) Assignee: Ferro Solutions, Inc., Roslindale, MA (US)

( * ) Notice: Subject to any disclaimer, the term of this patent is extended or adjusted under 35 U.S.C. 154(b) by 51 days.

(21) Appl. No.: 10/767,800

(22) Filed: Jan. 29, 2004

Related U.S. Application Data

(60) Provisional application No. 60/444,562, filed on Feb. 3, 2003.

(51) Int. Cl.
*H01L 41/08* (2006.01)
(52) U.S. Cl. .................... 310/26; 310/328; 73/861.77; 324/260
(58) Field of Classification Search .................. 310/26, 310/311, 328–332; 73/861.77, 86; 324/260, 324/244
See application file for complete search history.

(56) References Cited

U.S. PATENT DOCUMENTS

| | | | | |
|---|---|---|---|---|
| 6,279,406 B1 * | 8/2001 | Li et al. | ................... | 73/861.77 |
| 6,437,558 B2 * | 8/2002 | Li et al. | ..................... | 324/174 |
| 6,515,382 B1 * | 2/2003 | Ullakko | ........................ | 310/26 |
| 6,580,271 B2 * | 6/2003 | Li et al. | ....................... | 324/260 |
| 6,686,205 B1 * | 2/2004 | Schultz et al. | ................. | 436/73 |
| 6,809,515 B1 * | 10/2004 | Li et al. | ....................... | 324/260 |
| 6,809,516 B1 * | 10/2004 | Li et al. | ....................... | 324/260 |
| 6,835,463 B2 * | 12/2004 | Srinivasan | ................... | 428/548 |

OTHER PUBLICATIONS

Kiyotake, et al, "Magnetoelectric Coupling in Terfenol-D/polyvinylidenedifluoride Composites", Applied Physics Letters, vol. 81, No. 1, Jul. 1, 2002, 2002 American Institute of Physics, pp. 100-101.
Grimes, et al., "Magnetoelastic Sensors For Remote Query Enviornmental Monitoring", Smart Mater. Struct. 8 (1999), 1999 IPO Publishing Ltd., pp. 639-646.
Ryu, et al., "Magnetoelectric Properties in Piezoelectric and Magnetostrictive Laminate Composites", Japanese Journal of Physics, vol. 40 (2001) p. 1, No. 8, Aug. 2001, 2001 The Japanese Society of Applied Physics, pp. 4948-4951.
White, N.M., et al., "Design and Modelling of a Vibration-Powered Micro-Generator", Measurement + Control, vol. 34, Nov. 2001, pp. 267-271.
Glynne-Jones, P., et al., "The Modelling of a Piezoelectric Vibration Powered Generator for Microsystems", Transducer '01—Eurosensors XV, The 11th International Conference on Solid-State Sensors and Actuators, Munich, Germany, Jun. 10-14, 2001, pp. 46-49.
Glynne-Jones, P., et al., "Towards a Piezoelectric Vibration-Powered Microgenerator", IEE Proc.-Sci Meas. Technol., vol. 148, No. 2, Mar. 2001, pp. 68-72.
Shearwood, C., et al., "Development of an Electromagnetic Microgenerator", Electronics Letters.
Amirtharaja, R., et al., "Self-Powered Signal Processing Using Vibration-Based Power Generation", IEEE Journal of Solid State Circuits, v. 33, n. 5, pp. 687-695 (1998).

(Continued)

*Primary Examiner*—Mark Budd
(74) *Attorney, Agent, or Firm*—Kudirka & Jobse, LLP

(57) ABSTRACT

In a vibrational energy harvester, an external vibration causes relative motion between a permanent magnet and a magnetic field sensing element composed of a magnetostrictive material bonded to an electroactive material. The changing magnetic field causes a rotation of magnetization in the magnetostrictive material and the rotating magnetization generates a stress in the magnetostrictive material. The stress is transmitted to the electroactive material, which responds by generating electrical power.

21 Claims, 5 Drawing Sheets

OTHER PUBLICATIONS

Meninger, S., et al., "Vibration-to-Electric Energy Conversion", IEEE Transactions on VLSI Systems, v. 9, n. 1, p. 64 (2001).

Shenck, N.S., et al., "Energy Scavenging with Shoe-Mounted Piezoelectrics", IEEE Microelectronics, v. 21, n. 3, May-Jun. 2001, p. 30-42.

Ghandi, K., "Compact Piezoelectric Based Power generation", Continuum Controls, Inc., DARPA Energy Harvesting Program Review, 2000.

Williams, C.B., et al., "Analysis of a Micro-Electric Generator For Microsystems," Transducer '95—Eurosensors IX, The 8th International Conference on Solid-State Sensors and Actuators, and Eurosensors IX, Stockholm, Sweden, Jun. 25-29, 1995, pp. 369-372.

Churchill, D.L., et al., "Strain Energy Harvesting for Wireless Sensor Networks," Smart Structures and Materials 2003: Smart Electronics, MEMS, BioMEMS, and Nanotechnology, Proceedings of SPIE, vol. 5055, (2003).

El-Hani, M., et al., "Design and Fabrication of a New Vibration-Based Electromechanical Power Generator", Sensors and Actuators, Elsevier Science B.V., 2001, pp. 335-342.

White, N.M., et al., "A Novel Thick-Film Piezoelectric Micro-Generator", Smart Materials and Structures 10, 2001, p. 850-852, Institute of Physics Publishing.

James, E.P., et al., "A Wireless Self-Powered Micro-System for Condition Monitoring", Department of Electronics and Computer Science, University of Southampton, Hampshire, England, 4 pages.

James, E.P., et al., "An Investigation of Self-Powered Systems for Condition Monitoring Applications", Sensors and Actuators, pp. 171-176, Elsevier B. V.

Roundy, Shad, et al., "A Study of Low Level Vibrations as a Power Source for Wireless Sensor Nodes", Computer Sommunications 26 (2003) pp. 1131-1144, Elsevier Science B.V.

Glynne-Jones, P., et al., "An Electromagnetic, Vibration-Powered Generator for Intelligent Sensor Systems", Sensors and Actuators, pp. 344-349, Elsevier B.V.

* cited by examiner

HIGH EFFICIENCY VIBRATION ENERGY HARVESTER

RELATED APPLICATIONS

This application claims the benefit of U.S. provisional application 60/444,562, filed Feb. 3, 2003.

FIELD OF THE INVENTION

This invention relates to apparatus and methods for converting small mechanical movements, such as vibrations and oscillations, into electrical energy.

BACKGROUND OF THE INVENTION

An energy harvester is a device that converts mechanical movements into electrical energy. This electrical energy can then be stored or used by other devices. Thus, an energy harvester of this type can produce useful electrical power from vibrations. For example, the vibrations of an air duct can be converted to electrical energy by an energy harvester and the electrical energy can then be used to power a sensor that measures the temperature of air in that duct. Therefore, the sensor will not require electrical wiring to a remote source of power or periodic battery changes.

Applications of such energy harvesters include supplementing other power sources or recharging batteries, thereby extending battery life; elimination of wiring for electrical devices remote from a power source, the powering of mobile electronic instruments as well as powering wireless monitoring and communications devices. These latter applications typically comprise the sensing of local conditions to generate monitoring data, optionally, the processing of that data and the wireless communication of the data to a central data processing point. Such applications include wireless health monitoring; wireless monitoring of temperature, air flow, humidity, and gas content in heating, ventilation and air-conditioning (HVAC) systems; wireless monitoring of traffic flow, turbulence, noise, troop or other personnel movements; wireless, self-powered security systems; and "condition-based maintenance" systems including passive detection of creep or crack propagation in structures.

There are a variety of conventional devices for generating electrical power from vibrations, oscillations or other mechanical motions. These devices include inductive devices, capacitive devices, and piezoelectric devices. Inductive devices that convert vibrations to electrical power essentially work like an acoustic speaker (in which electrical signals are converted into vibrations of the speaker cone) in reverse. This operation can also be considered on the basis of the generator principle, that is, Faraday's law of induction:

$$V(t) = N \frac{\partial B}{\partial t} A$$

The voltage generated by induction is proportional to the number of turns, N, in an electrical winding and the rate of flux change through those windings $$\frac{\partial B}{\partial t} A,$$

where $\partial B$ is the flux density change during the vibration and A is the area of the coil through which the flux change perpendicular to the coil plane is measured by the N turns.

One problem with conventional inductive energy harvesters is that the voltage generated decreases for vibrations at lower frequencies. Also, their energy density is reported to be low. In order to increase output voltage, either the product NA must be increased or the flux change $\partial B$ must be increased. Consequently, the power produced by inductive energy harvesters is presently limited by coil size (to increase NA), the need for heavy, powerful permanent magnets to produce a large flux density change $\partial B$, and large vibration frequencies (to increase $$\left(\text{to increase} \frac{\partial B}{\partial t}\right).$$

Typical reported output voltages are low unless the device is large. For example, with a flux $\partial B = 0.5$ Tesla coupled to a 10 Hz vibration so that $$\frac{\partial B}{\partial t} = 2\pi f \Delta B \approx 100$$

Tesla/second, a device with a one cm² area sensed by a 500 turn coil generates an induced voltage of approximately five volts into an infinite load impedance. However, in a practical system, as the load impedance decreases, current flows and, in accordance with Lenz's law, generates a back EMF that opposes the motion of the magnet and opposes the induced voltage thereby reducing the power output. Consequently, small systems described in the literature report an average power output of approximately only 0.3 microwatts (for example, see "Development of an Electromagnetic Microgenerator", C. Shearwood and R. B. Yates, *Electronics Letters*, v. 13, p. 1883 (1997)). The maximum power output of another small inductive energy harvester has been estimated to be 400 microwatts ("Self-Powered Signal Processing Using Vibration-Based Power Generation", R. Amirtharaja and A. Chandarakasan, *IEEE Journal of Solid State Circuits*, v. 33, n. 5, pp. 687–695 (1998). The size of these devices indicates that the power density that can be achieved by inductive harvesters is in the range of 0.005 to 0.5 milliwatts/cm³.

Capacitive devices make use of the capacitor equation:

$$Q(t) = CV = \kappa \varepsilon_0 \frac{A(t)}{d(t)} V$$

The devices are arranged so that external vibrations vary the capacitor plate overlap area (A) and/or the capacitor plate spacing (d). Thus, a vibration causes a change in charge on the capacitor when a voltage is applied to the device. When the capacitor is used to drive a load, the charge flow is damped with a characteristic decay time given by the time constant, $\tau = RC$. Both the inductive and capacitive devices generate an electrical signal that varies with a frequency that is the same as the vibration frequency.

Capacitive vibration energy harvesters have several drawbacks. First, they require an auxiliary source of power, such as a battery, and use some of the generated power to run the device. Secondly, as with the inductive devices described above, the power generated by capacitive devices and the resulting energy density is relatively modest. Literature reports for micro-electro-mechanical (MEMS) inter-digitated capacitor energy harvesters indicate an average power of eight microwatts. See "Vibration-to-electric energy conversion" S. Meninger, J. O. Mur-Miranda, R. Amirtharajah, A. Chandrakasan, et al., *IEEE Transactions on VLSI Systems*, v. 9, n. 1, p. 64 (2001). The very small size of this MEMS device puts its energy density in the range of 0.01 to 0.1 milliwatts/cm$^3$.

Piezoelectric materials generate a voltage when they are stressed in accordance with a piezoelectric equation:

$$v = g_{33}^{piezo} \sigma \cdot d$$

where $g_{ij}$ is a coefficient that describes the ability of the piezoelectric material to convert a stress to a voltage, $\sigma$ is the stress applied to the piezoelectric material, and d is the spacing between electrodes that measure the voltage. Ceramic (polycrystalline) piezoelectric elements, flexible piezoelectric fiber composites, or polymeric electroactive materials can be used in various energy harvesting applications. One proposed class of electroactive energy harvesters makes use of the periodic compression in the heel of a shoe or boot caused by walking to stress a piezoelectric material in order to generate power. Walking generates a stress on the order of 200 lbs. over 10 in$^2$ or 1 to 2×10$^5$ Pa. With piezoelectric stress coupling coefficients typically in the range 5-20 millivolt/(meter-Pa), the voltage generated by a piezoelectric energy harvester in such an application would be of order 1.3 volts, with a power density (½CV$^2$) on the order of 2/R watts/cm$^3$.

In a real device constructed with piezoelectric polymers, walking impact generated an average power of approximately 8 milliwatts ("Energy Scavenging with Shoe-Mounted Piezoelectrics", N. S. Shenck and J. A. Paradiso, *IEEE Microelectronics*, v. 21, n. 3, May-June 2001, p. 30–42) Another device using piezoelectric fiber composites projects an ultimate average power density of approximately 0.1 milliwatts/cm$^3$ ("Compact Piezoelectric Based Power generation", K. Ghandi, Continuum Controls, Inc., *DARPA Energy Harvesting Program Review*, 2000). The small size of these devices puts their energy densities in the range of 0.1 to 1.0 milliwatts/cm$^3$ with projections up to 5 millwatts/cm$^3$.

Therefore, there is a need for an energy harvesting device with improved output power.

SUMMARY OF THE INVENTION

In accordance with the principles of the invention, an external vibration causes relative motion between a permanent magnet and a magnetic field sensing element composed of a magnetostrictive material bonded to an electroactive material. The changing magnetic field causes a rotation of magnetization in the magnetostrictive material and the rotating magnetization generates a stress in the magnetostrictive material. The stress is transmitted to the electroactive material, which responds with a voltage.

The stress generated by a magnetic material when its magnetization is rotated can range up to 60 MPa, which is considerably larger than stresses produced directly with human (approximately 10$^4$ Pa) or mechanical (1 or 2×10$^5$ Pa) motion. Since the magnetostrictive stress is larger than other stresses, the voltages produced in the electroactive material by magnetoelastic coupling are larger than if the mechanical stress acted directly on the material. Thus, a device constructed in accordance with the invention is more effective in generating electrical power from vibrations than any of the prior art technologies.

In one embodiment, the electroactive material is a piezoelectric material and the voltage across the piezoelectric material is measured in a direction that is parallel to the plane in which the magnetization in the magnetostrictive material rotates. With this configuration, the magnitude of the voltage developed by the piezoelectric material is maximized.

In another embodiment, the device is constructed so that a linear relative motion between the magnet and the magnetic field sensor generates an output.

In yet another embodiment, the device is constructed so that a rotary relative motion between the magnet and the magnetic field sensor generates an output.

BRIEF DESCRIPTION OF THE DRAWINGS

The above and further advantages of the invention may be better understood by referring to the following description in conjunction with the accompanying drawings in which.

DETAILED DESCRIPTION

Figure 1:
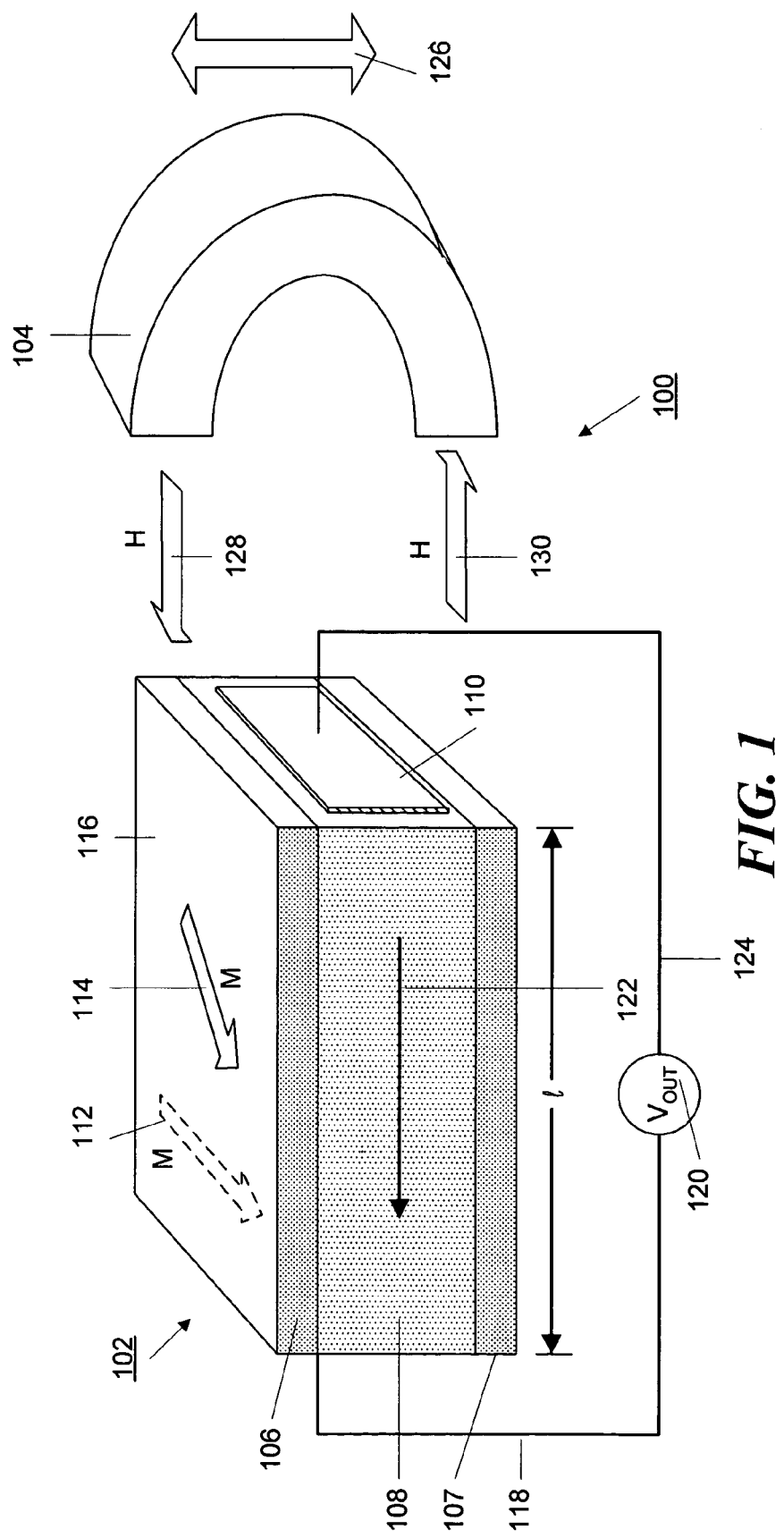
FIG. 1 is a block schematic diagram of a vibration energy harvester constructed in accordance with the principles of the present invention.

FIG. 1 is a block schematic diagram of an embodiment of a vibration energy harvester 100 constructed in accordance with the principles of the invention. The energy harvester 100 comprises a magnetic field sensor 102 and a permanent magnet 104. The sensor 102 comprises two magnetostrictive layers 106, 107 that are bonded to a piezoelectric layer 108 by suitable means, such as conductive epoxy glue. Although two magnetic layers 106 and 107 are shown bonded to a single piezoelectric layer 108, those skilled in the art would understand that one or more magnetic layers can be used without departing from the spirit and scope of the invention. Two metallic electrodes, of which only electrode 110 is shown in FIG. 1 are applied to the piezoelectric layer 108.

Each magnetostrictive layer, such as layer 106, has a quiescent magnetization vector (M) which orients itself to minimize the sum of the magnetic (magnetocrystalline, magnetoelastic and magnetostatic) energies. The magnetic properties of layer 106 can be engineered so that the quiescent magnetic vector M would be oriented parallel with the longest side of the rectangle as shown by the dotted arrow 112 in FIG. 1. In embodiments in which two magnetostrictive layers are bonded to a piezoelectric layer, such as layers 106 and 107 in FIG. 1, the layers are annealed or otherwise constructed so that the quiescent magnetization vector in one layer, such as layer 106, is opposite to the quiescent magnetization vector in the other layer, such as layer 107. In this manner the stress applied to the piezoelectric layer 108 by rotation of the magnetization is maximized.

Magnet 102 generates a magnetic field of moderate intensity, typically on the order of 0.4 Tesla and applies a magnetic field (H) in a direction (schematically indicated by arrows 128 and 130) to the sensor 102. The energy harvester 100 is constructed so that vibrations or mechanical movement cause the magnet 104 to move relative to the sensor 102 in the direction of arrow 126. The relative motion of the sensor 102 and the magnet 104 causes the magnetic field to change in the vicinity of the sensor 102. In turn, the changing field causes a rotation of the quiescent magnetization vector 112 in the plane 116 of the magnetic material 106 as indicated by arrow 114. The field-induced magnetization rotation depends on the anisotropy field, $H_a$, holding the magnetization in its quiescent orientation, which is also the field needed to saturate the magnetization in its hard direction.

A rotation of the magnetization vector M produces a stress in the magnetostrictive layer 106. The stress is maximized when the external magnetic field H is applied at a 90° angle to the quiescent magnetization vector M. In a free (mechanically unstressed) material the stress would lead to a magnetostrictive strain (magnetostriction). In the energy harvester 100, the magnetostrictive material 106 is bonded to the piezoelectric material 108 and is not free to strain fully. Instead, the stress is transmitted to the piezoelectric material 108, which responds with a voltage. The stress generated by a magnetic material 106 when its magnetization is rotated can range up to 60 MPa, which is considerably larger than the stresses generated directly by mechanical motion. Thus, the combination of magnetostrictive and piezoelectric materials is inherently more effective in generating electrical power from vibrations than the inductive, capacitive or piezoelectric technologies discussed previously.

The stress-induced voltage in the piezoelectric material 108 is measured across a pair of electrodes of which only electrode 110 is shown in FIG. 1. The other electrode is located on the face opposite electrode 110. The magnitude of the voltage developed across the electrodes is proportional to the magnetic field strength and can be detected by a device 120 that is connected to electrodes by conductors 118 and 124, respectively.

In accordance with the principles of the invention, the sensor is constructed so that stress-induced voltage is measured in a direction that is parallel to the plane 116 in which the magnetization rotates. The stress is generated in the magnetic material 106, which responds to the change in the magnetic field 128 and 130 (H) with a magnetoelastic stress, $\sigma_{mag}$ that has a value in the approximate range of 10 to 60 MPa. Because the magnetic material 106 is bonded to a piezoelectric layer 108, the layer 108 responds to the magnetostrictive stress with a voltage proportional to the stress, σ, transmitted to it. Piezoelectric materials respond to a stress with a voltage, V, that is a function of the applied stress, a voltage-stress constant, $g_{ij}$, and the distance, l, between the electrodes. In particular, $$\partial V = g_{ij}^{piezo} \partial \sigma_{mag} l$$

If the voltage is measured in a direction parallel to the direction in which the stress changes in accordance with the principles of the present invention, then $g_{ij} = g_{33}$. Thus, the sensor operates in a $d_{33}$ mode. For a typical piezoelectric material $g_{33} = 24$ millivolt/(meter-Pa)=0.024 volt-meter/Newton. In this case, a stress of 1 MPa generates an electric field of 24 kilovolt/meter. This field generates a voltage of 240 V across a 1 cm (l=0.01 m) wide piezoelectric layer. The voltage output of the field sensor 102 can be tailored to the application needs by varying the aspect ratio of the sandwich; making the distance (l) between the electrodes smaller and increasing the cross-sectional area of the electrodes, results in a larger current output at the expense of output voltage. Within limits, such modifications leave the power output of the device essentially unchanged.

The fraction of the magnetostrictive stress, $\sigma_{mag}$ transferred from magnetic layer 106 to the piezoelectric layer 108 depends on the (stiffness×thickness) product of the magnetic material, the effective stiffness of the bond between the magnetic and electric elements (proportional to its stiffness/thickness), and the inverse of the (stiffness×thickness) of the piezoelectric layer 108. The stress generated by the magnetic material 106 depends on the extent of rotation of its magnetization, a 90 degree rotation producing the full magnetoelastic stress.

For a common piezoelectric material, $g_{33} \approx 24$ millivolt (meter-Pa)=0.024 V-m/N, so a stress of 1 MPa generates an electric field of 24 kV/m that corresponds to 240 V across a 1 cm thick piezoelectric layer. A quality factor may be defined from the above equation to indicate the voltage output of the inventive device per unit magnetic field, H (Volts–m/A):

$$\frac{\partial V}{\partial H} \approx g_{33}^{piezo} \left( \frac{\partial \sigma_{mag}}{\partial H} \right)$$

Many known magnetostrictive materials can be used for the magnetic layers 106 and 107. These include various magnetic alloys, such as α-FeBSi, nickel and iron-nickel alloys, iron-cobalt alloys such as $Fe_{50}CO_{50}$ (Hyperco). A material that is also suitable for use with the invention is Terfenol-D® ($Tb_xDy_{1-x}$, $Fe_y$), an alloy of rare earth elements Dysprosium and Terbium with 1d transition metal Iron, manufactured by ETREMA Products, Inc., 2500 N. Loop Drive, Ames, Iowa 50010 or other companies outside the United States. While it is desirable to use a material with large magnetostriction for the magnetic layers, it is more important that the magnetostrictive material have a large product of magnetostrictive stress and stiffness modulus. This insures that the material more effectively transfers its stress to the piezoelectric material. While FeCo shows a relatively large magnetostriction (approaching 100 ppm) and is extremely stiff, the product of these parameters translates to a magnetostrictive stress of 12 MPa. Terfenol-D on the other hand, is softer than FeCo but shows a much larger magnetostrictive strain; its magnetostrictive stress approaches 60 MPa.

The magnetization of either of these materials can be rotated in a field of a few hundred Oersteds (Oe) provided they are properly annealed and the aspect ratio in the magnetizing direction is favorable. For example, Terfenol-D® can generate a maximum stress of order 60 MPa for a 90-degree rotation of magnetization. Such a rotation can be accomplished by an external applied magnetic field on the order of 400 to 1000 Oe. Softer magnetic materials, such as certain Fe-rich amorphous alloys, may achieve full rotation of magnetization in fields of order 10 Oe, making them suitable for the magnetic layer in a sensor for sensing weaker fields. However, the full stress coupled to the piezoelectric layer from such materials is about 10 MPa. The piezoelectric layer can be comprised of lead zirconium titanate ceramics $Pb(Zr_xTi_{1-x})O_3$, and polyvinylidene fluoride polarized polymers PVDF, aluminum nitride AlN and quartz $SiO_x$.

In another embodiment, the ceramic piezoelectric layer 108 can be replaced by single crystal piezoelectrics or by an electrostrictive or by a relaxor ferroelectric layer that generates the output voltage. Collectively, the piezoelectric, electrostrictive and relaxor ferroelectric layers are called "electroactive" layers. Electroactive materials such as the commercial piezoelectric lead-zirconate-titanate (PZ)T have $g_{13}$ and $g_{33}$ values approximately equal to 10 and 24 mV/(Pa-m), respectively. Thus, deformations of the piezoelectric parallel to the direction across which the voltage is measured, are more effective in generating a voltage than deformations transverse to this direction. Further, relaxor ferroelectrics have $g_{ij}$ values that can be 3 to 4 times those of piezoelectrics. As commercial relaxor electroactive materials become more available, they should make significant improvements in the electrical power that can be harvested from a given vibration.

Figure 2:
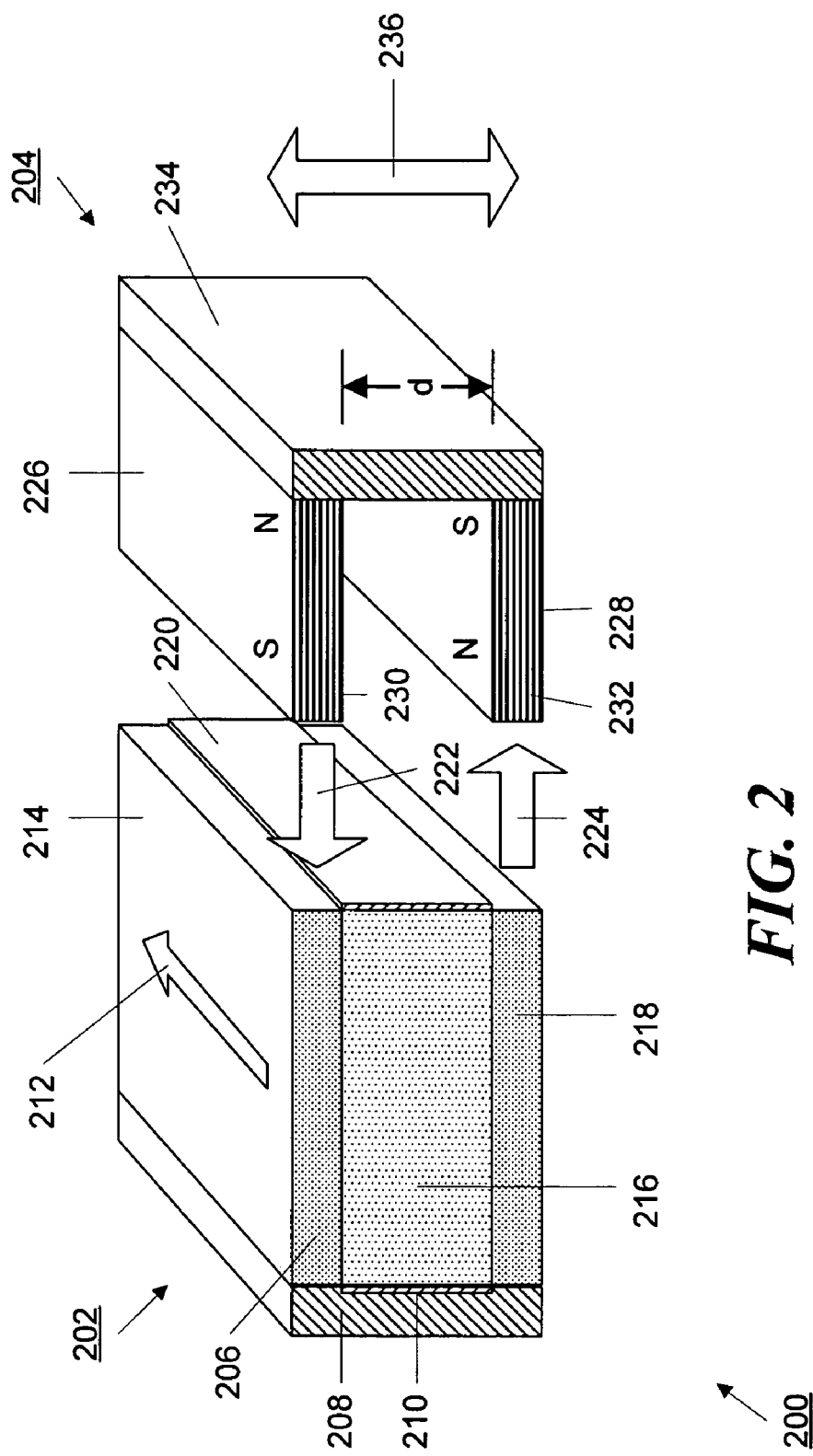
FIG. 2 is a block schematic diagram of another embodiment of a vibration energy harvester constructed in accordance with the principles of the present invention

The source of the magnetic field needed to change the magnetization in the magnetostrictive layers 106, 107 is most conveniently a permanent magnet. It can be configured as a bipolar (horseshoe) magnet 104 as shown in FIG. 1 or it can be a multi-pole array such that the flux coupled through the magnetostrictive layers tends to change direction as the poles change their alignment relative to the position of the magnetic layers on the sensor. FIG. 2 shows an embodiment constructed in accordance with the principles of the invention in which vibrational motion couples to relative linear motion in the harvester components.

In the vibration energy harvester 200 shown in FIG. 2, the sensor 202 comprises two magnetostrictive layers 206 and 218 that are bonded to an electroactive layer 216 by suitable means. The magnetic field source 204 is comprised of a pair of rigid permanent magnets 226 and 228 that generate a magnetic field poled in the direction indicated by arrows 222 and 224. The poles 230, 232 of magnet source 204 must be closer to the magnetic layers 206 and 218 than the distance, d, between the two permanent magnets 226 and 228. In a preferred embodiment, there is a flux closure yoke 234 located across the gap at the outside of the permanent magnets 226 and 228 and there is a flux closure yoke 208 located across the magnetostrictive layers 206 and 218.

In the absence of an applied magnetic field, the magnetic, magnetostrictive layer 214 has a quiescent magnetization vector in the direction of arrow 212. The layer 218 has a magnetization vector that is parallel to arrow 212, but poled in the opposite direction. When the magnetic field source 204 is located close to the field sensor 202 and when the source 204 vibrates in the direction indicated by arrow 236, the flux coupling through the magnetic layers 206 and 218 varies. In another embodiment, the field source 204 could also vibrate toward and away from the sensor, that is, in the horizontal direction in FIG. 2. More specifically, when the magnet field source 204 is located so that its pole pieces 230 and 232 are closest to the two magnetic layers 206 and 218, more flux couples through the layers 206 and 218 and tends to rotate the magnetization vector away from the zero-field direction 212 and more into the field direction indicated by arrows 222 and 224. This magnetization rotation brings about a magnetostrictive stress in the magnetic layers 206 and 218 that is transferred to the electroactive element 216. A voltage then appears across the electrodes 210 and 220.

Figure 3:
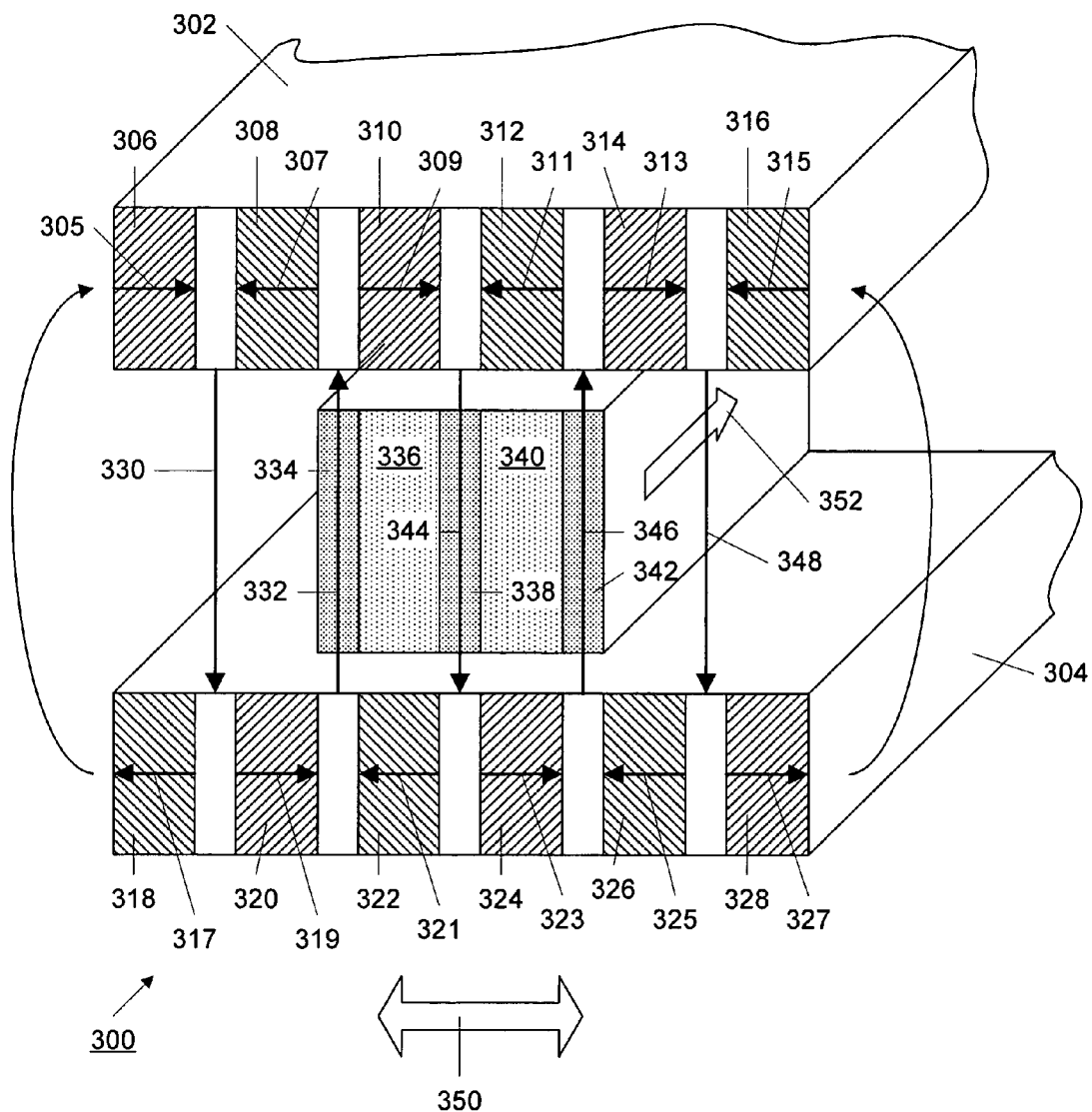
FIG. 3 is a block schematic diagram of another embodiment of a vibration energy harvester constructed in accordance with the principles of the present invention in which linear vibration is coupled directly to relative linear motion.

In another embodiment of the invention, linear vibration can be coupled directly to relative linear motion between a field source and the field sensor as shown in the energy harvester 300 that is illustrated in FIG. 3. The field source comprises two opposing multiple-pole permanent magnet arrays 302 and 304 that, together, generate an alternating field pattern.

The individual magnets 306–316 and 318–328 in each of the two permanent magnet arrays 302 and 304 are arranged in a multi-pole, head-to-head arrangement in which the field (indicated by arrows 305–315 and 317–327) from adjacent magnets is opposing. The magnets may be separated by a soft magnetic layer to concentrate the vertical leakage flux in the thinnest possible region. This arrangement gives an alternating vertical field schematically illustrated as arrows 330–348. The magnetic field sensor can also be arranged as a multilayer stack. In FIG. 3, the magnetic field sensor is comprised of three layers of magnetostrictive material 334, 338 and 342 and two layers of electroactive material 336 and 338. The magnetic layers 334, 338 and 342 are aligned with the strongest field indicated by arrows 332, 344 and 346 and have a quiescent magnetization vector as indicated by arrow 352. The direction of vibration is schematically indicated by arrow 350 and either the sensor array or the magnet array may be fixed with the other in motion.

The geometry illustrated in FIG. 3 is well suited to the use of thinner and softer magnetostrictive layers in the magnetic field sensor. For example, an amorphous magnetic alloy can be used in the magnetostrictive layers 334, 338 and 342. When such an alloy is used, a magnetic field with a field strength on the order of only a few tens of Oersteds, is needed to rotate the magnetization 90 degrees thereby producing maximum stress. However, such materials have a smaller magnetostriction compared to the magnetostriction of other materials, such as Terfenol-D® and, consequently, would produce a lower output voltage. In order to compensate for the smaller magnetostriction, electroactive materials that produce higher output voltages for a given stress, such as polymer piezoelectrics, can be used.

Figure 4:
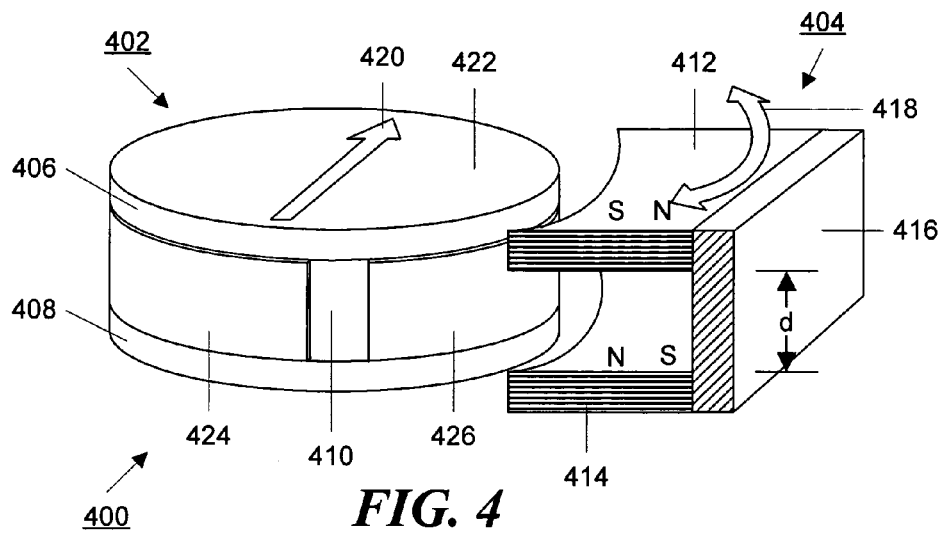
FIG. 4 is a block schematic diagram of another embodiment of a vibration energy harvester constructed in accordance with the principles of the present invention in which the magnetic layer has circular symmetry.

One problem with the rectangular shape of the magnetic field sensors illustrated in FIGS. 1, 2 and 3 is that there is shape anisotropy in the plane in which the magnetization vector rotates. In particular, as previously mentioned, the magnetization vector aligns itself in order to minimize the number of magnetic poles on the surface of the magnetic layer. Thus, the vector resists rotation from this minimum pole configuration simply due to the shape of the layer. It is possible to overcome this resistance due to shape anisotropy by using a magnetic layer with circular symmetry as shown in FIG. 4. In this embodiment of a vibration harvester 400, the magnetic field sensor 402 is cylindrical. In particular, the magnetostrictive layers 406 and 408 are circular as is the electroactive layer 410. However, the layers could also be elliptical as well as circular. Together, the circular or elliptical layers are referred to as "disk-shaped." In addition, the electroactive layers need not be circular and are preferably rectangular, with a diameter, or width, comparable to, or less than, that of the circular magnetic layer. The magnetic field source 404 is a pair of permanent magnets 412 and 414 with a flux closure yoke 416 spanning the gap between the magnets. As with the previous embodiment, the poles of the magnet are preferably located closer to the magnetostrictive layers 406 and 408 than the distance, d, between the magnets 412 and 414. The vibration harvester 400 is constructed, so that, under the influence of the mechanical vibration, the cylindrical magnetic field sensor 402 and the magnetic field source 404 rotate relative to each other in the direction indicated schematically by arrow 418.

A magnetostrictive element, such as element 406 with circular symmetry has essentially zero shape anisotropy in the plane. In this embodiment, the quiescent magnetization vector 420 rotates in the plane 422 of the circular magnetostrictive layers 406 and 408 with no interference from magnetostatic effects. The only impediments to the rotation of the magnetization vector 420 in the plane 422 are the intrinsic anisotropy of the magnetostrictive layer 406 and, to a small extent, eddy current damping at higher vibration frequencies. Circular symmetry has no significant detrimental effect on the electrical power generated in the electroactive element provided an adequate gap is maintained between the opposing ends of electrodes 424 and 426. If the electroactive layer also is circular, generally, each electrode should have an arc length of approximately ⅛ to ⅜ of the circumference of the electroactive element.

Figure 5:
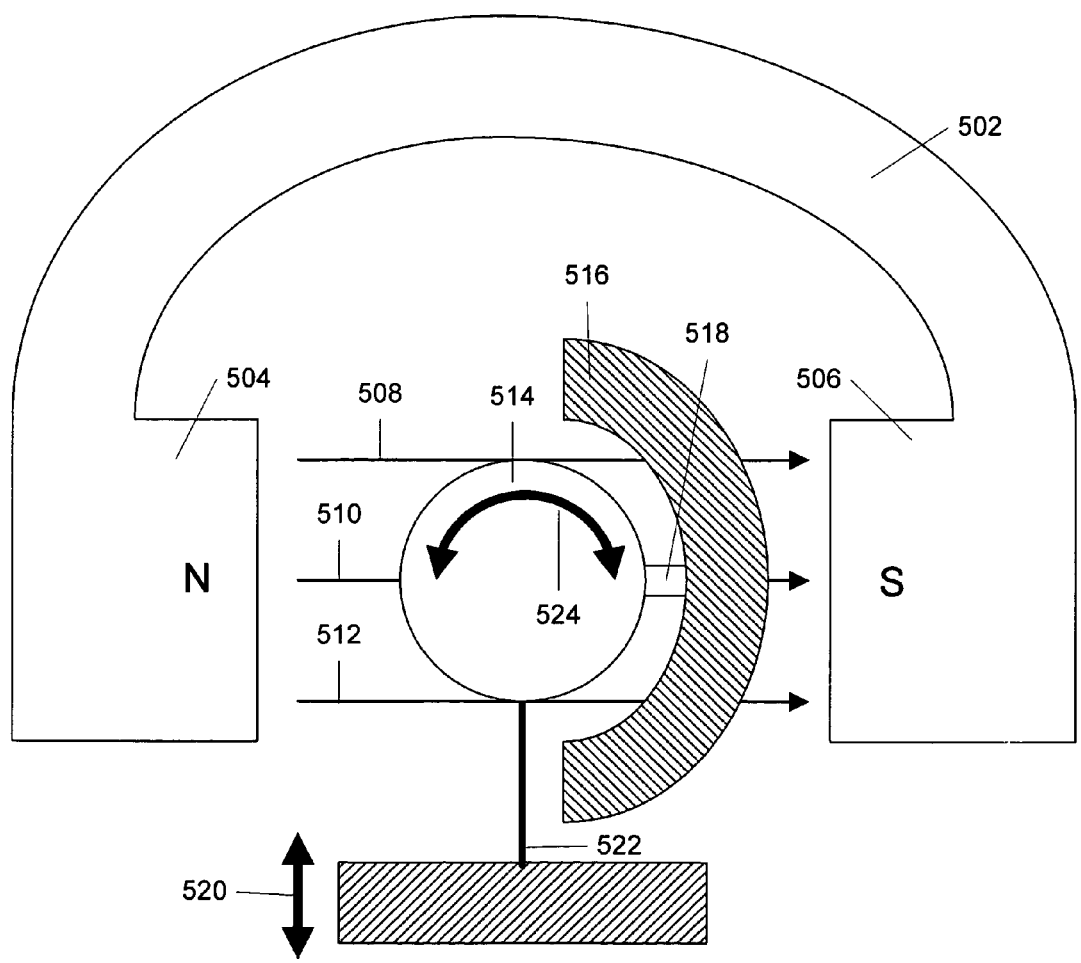
FIG. 5 is a block schematic diagram of still another embodiment of a vibration energy harvester constructed in accordance with the principles of the present invention in which the magnetic layer has circular symmetry.

Although the cylindrical field sensor configuration has advantages, in many applications the vibration is essentially linear. However, other embodiments of the invention can convert a linear vibration to circular motion so that the cylindrical field sensor arrangement can be used even in these applications. A further embodiment of a vibration energy harvester 500 is illustrated in FIG. 5. Energy harvester 500 comprises a permanent magnet field source 502 having poles 504 and 506 that develop a magnetic field illustrated schematically by field lines 508, 510 and 512. Although a permanent magnet is shown in FIG. 5, those skilled in the art would understand that various other magnet configurations could be used to generate the required magnetic field. This magnetic field source differs from that shown in FIG. 4 in that both poles 504 and 506 of magnet 502 are in the same plane as the rotation of sensor 514.

A magnetic field sensor 514 is located in this field. Sensor 514 is essentially the same as field sensor 402 shown in FIG. 4 and is seen from the top. The sensor 514 rotates on a central axis and is supported by a leaf spring 522. An inertial mass 516 is rigidly attached to the sensor by a strut 518. A vibration applied to the unit in the direction of arrow 520 causes the magnet 502 and the sensor/mass unit to oscillate in the vertical direction. However, the inertia of mass 516 introduces a torque around the axis of sensor 514 causing a rotational movement in the direction if arrow 524. This latter rotation generates the power output from the device. Other modifications are possible. For example, the inertial mass 516 can be replaced by the magnet 502 so that the magnet rotates relative to the field sensor 514. Alternatively, the inertial mass could be sensor 514 itself (rotating relative to a fixed magnet 502). It is also possible to have both the magnet 502 and the sensor 514 counter-rotating to increase the angular rotation of the magnetization. Counter-rotation doubles the angular variation of the magnetization in the magnetostrictive layers of the sensor and hence enhances the fraction of the magnetostrictive stress transmitted to the field sensor. However, in many applications, it is preferable to have the source of magnetic field stationary in order to avoid damping and noise generation from interactions between the moving magnetic field and nearby metallic parts. The leaf spring 522 and the mass 515 need not be in the same plane as the sensor and field source. In addition, the leaf spring 522 can be replaced by one or more coil or torsional springs located at the axis of rotation of sensor 514.

In order to amplify the ambient vibrations, most energy harvesters make use of tuned, resonant systems. For example, see "A Modified Passive Tuned Absorber for Secondary Systems Under Random Excitation.", S. Ma and E. Semercigil, *Journal of Sound and Vibration, v.* 208, n. 3, pp. 349–366, (1997) and, "An Actively Tuned Solid State Vibration Absorber Using Capacitive Shunting of Piezoelectric Stiffness," C. L. Davis and G. A. Lesieutre, *Journal of Sound and Vibration*, v. 232, p. 601, (2000). For small energy harvesting devices that harvest vibration energy from a relatively large source, it can be safely assumed that the energy harvesting device does not change the vibration characteristics of the source. Given the vibration acceleration and the dominant frequency of an external source of vibrations, (for example, 0.5 g at 70 Hz, where g is the acceleration of gravity), the equations of mechanical harmonic motion may be solved to indicate the mass and spring stiffness that make the harvester resonant with the external vibration. Ideally, in a highly-tuned, high-Q harvester, the amplitude of the external vibration is amplified by the value of A: $A_{system} \sim A_{ext}Q$.

Figure 6:
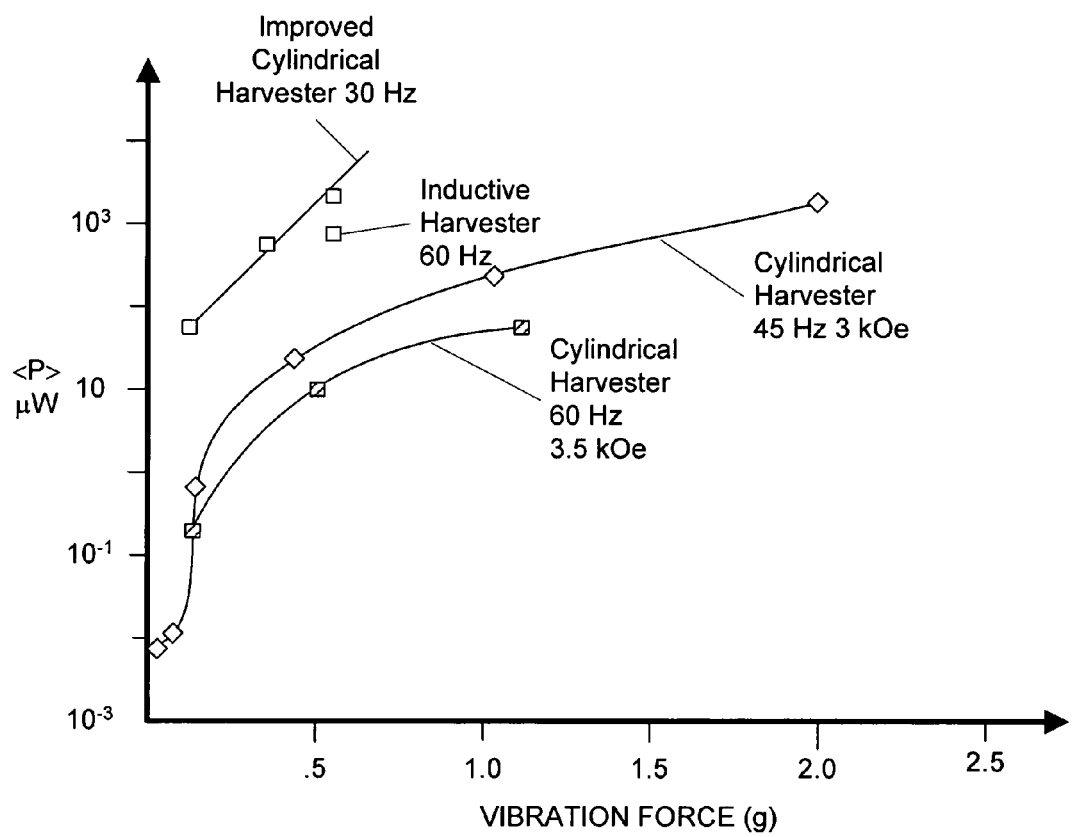
FIG. 6 is a graph of experimental results for output power as a function of vibration force.

FIG. 6 shows some experimental results for output power as a function of vibration (g) force measured on a harvester embodying the design element described here and having sensor dimensions of order 2 cm in diameter and 0.9 to 1.0 cm in thickness. The vertical axis represents the log power in microwatts and the horizontal axis represents the vibration force in g. The data at 45 and 60 Hz are taken from a vibration energy harvester with the cylindrical magnetic field sensor supported on a leaf spring as illustrated in FIG. 5. The mass 516 is fabricated from Macor material. In the cylindrical harvester shown in FIG. 5, an average power of 1 milliwatt was achieved for vibration of 2 g acceleration at 45 Hz and a harvested power of 10 microwatts was achieved for 0.5 g acceleration at 60 Hz. Also shown in FIG. 6 is data taken from an improved cylindrical energy harvester similar to that of FIG. 5 where the leaf spring 522 has been replaced by a more compact coil spring and the Macor mass has been replaced by a denser tantalum mass. In this latter improved harvester, an absolute power of 1.2 milliwatts was achieved in 0.5 g at 30 Hz. For comparison, a data point from a prior art inductive energy harvester is included that indicates a power output of about 0.8 milliwatts at 0.5 g.

The experimental results indicate that a power level of a few milliwatts is achievable for a vibrational energy harvester constructed in accordance with the principles of the invention and in which the sensor has a volume of a few cubic centimeters. Output power decreases with decreasing g force as expected. Output power can be improved by using a heavier inertial mass and a high Q spring; these improvements can increase the output power well into milliwatt level for low g vibrations (for example, for a few tenths of a g). A good rechargeable lithium-ion battery of one cubic centimeter volume can last about one year if an average power of less than about 10 or 20 microwatts is drawn from it, but it may last only a few days when one milliwatt is drawn from it. Unfortunately, many electronic circuits often require power levels in this range. For example, digital signal processing circuits can require over 1 milliwatt and video decompression circuits well over 0.1 milliwatt. However, with an output power of five milliwatts, which is achievable with the energy harvesters of the present invention, a one cubic centimeter lithium-ion battery can be recharged in a few hours.

Figure 7:
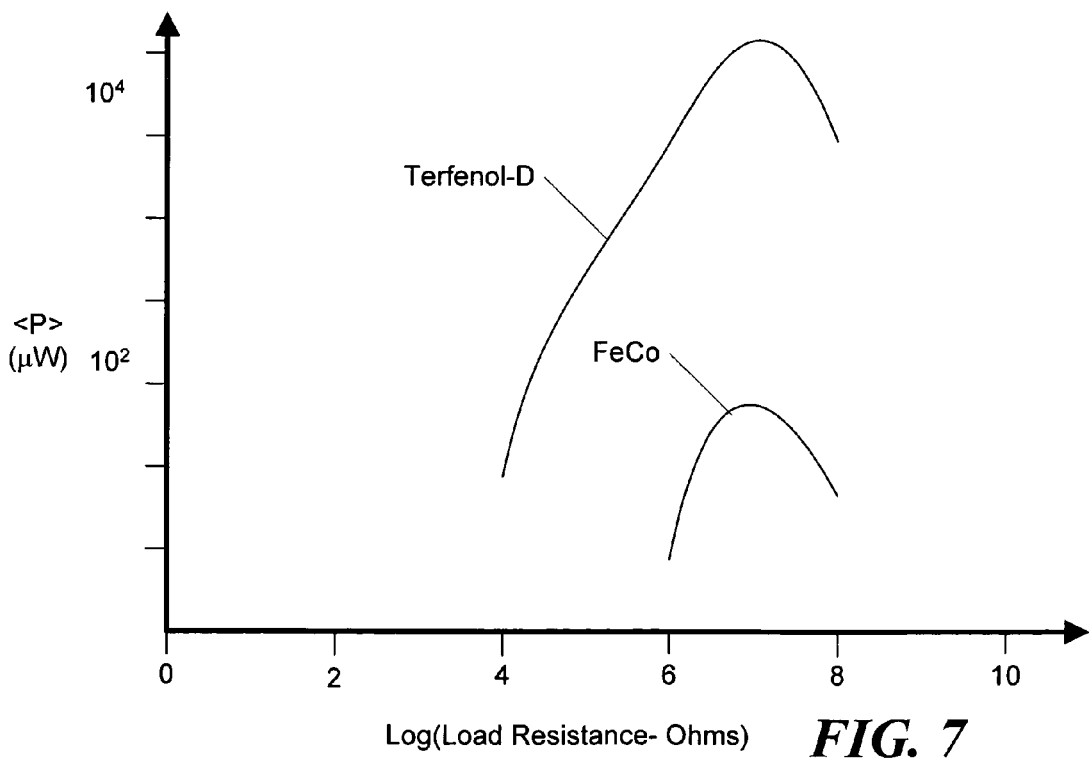
FIG. 7 is a graph of experimental results for the log of output power as a function of load impedance for two energy harvesters constructed in accordance with the principles of the invention.

FIG. 7 shows experimental measurements of the log of the output power ($V_{rms}^2/R$) as a function of load impedance for two small (<1 cm$^3$) energy harvesters of the present invention, one using Fe—Co in the magnetostrictive layer, the other using Terfenol-D® in the magnetostrictive layer. As shown, the Terfenol-D® device performs dramatically better than the FeCo device. The output power of a small cylindrical harvester constructed in accordance with the present invention using Fe-Co magnetostrictive layers has been tested as a function of vibration acceleration (g-force) and of vibration frequency by tuning it mechanically. The output voltage is relatively independent of frequency over a bandwidth of a few hundred Hz. The output RMS voltage decreases linearly with decreasing g-force. It typically has a value of 2 $V_{rms}$ for 1-g in the Fe-Co device. The data of FIG. 7 suggest that at least an order of magnitude greater voltage (two orders greater power density) would be obtained from a comparable Terfenol-D® based device.

Devices constructed in accordance with the principles of the present invention are versatile in the sense that the output voltage and current can be varied (while their product remains approximately constant) by choosing the electrode spacing and electroactive element dimensions appropriately. The main reason why the measured output power of harvesters constructed in accordance with the principles of the present invention and its projected limit already exceed those of other technologies, is because of the unique combination of two active materials (magnetostrictive and electroactive) which act to amplify the effects of the vibration on either type of material alone. Also, inventive harvesters utilize a $g_{33}$ mode, which is a more effective way to use electroactive materials, giving significant advantage compared to the 931 mode used in prior art magnetic field sensors.

Due to the increased output voltage of the sensors of the present invention, it is expected that they could replace vibration energy harvesters of the prior art (inductive or piezoelectric) and will also open new applications not yet accessible to harvesters of the prior art. Applications of these vibration energy harvesters are seen in many wireless monitoring applications (wireless monitoring is meant herein to include local, self-powered sensing, processing and self-powered, wireless communication to a central data gathering point). More specifically, these applications include supplying power for wireless health monitoring of machines, living or structural parts for what is sometimes referred to as "condition-based maintenance"; supplementing power on road, rail, air or water vehicles or recharging their batteries; elimination of wiring on trucks, trailers, trains, boats etc. by harvesting local vibration energy for tail-lights, sensors, and/or transmitters; wireless monitoring of air flow, temperature variations, vibrations or gas content in heating, ventilation and air-conditioning (HVAC) ducts to adapt HVAC or other systems to local conditions; wireless detection of fluid flow, traffic flow, turbulence or noise and self-powered transmission of said information; wireless sensing of troop or other personnel movements; wireless, self powered vibration sensors for home, building or vehicle security systems; energy harvesting from human or animal motion to achieve temperature control or powering of mobile electronic instruments; and possibly even passive detection of creep or crack propagation in structures for condition based maintenance. Numerous other applications are now more accessible because of the enhanced output voltage produced by this new invention. Particularly, new applications are expected in mine detection, ship detection, geophysical exploration, linear and rotational motion detection, data reading from credit cards, tapes and other magnetic information storage media, meter readers, antilock breaking systems, etc. It is also likely that the new sensors of the present invention will open totally new applications in energy harvesting.

Although an exemplary embodiment of the invention has been disclosed, it will be apparent to those skilled in the art that various changes and modifications can be made which will achieve all or some of the advantages of the invention without departing from the spirit and scope of the invention. For example, it will be obvious to those reasonably skilled in the art that, in other implementations, other known materials different from those listed may be used. Other aspects and modifications to the inventive concept are intended to be covered by the appended claims.

What is claimed is:

1. A vibrational energy harvester that converts mechanical vibrations into electrical energy, comprising:
   a magnetic field source that generates a magnetic field;
   a magnetic field sensing element including a layer of magnetostrictive material having a magnetization vector that responds to variations in the magnetic field by generating a stress, a layer of electroactive material, mechanically bonded to the layer of magnetostrictive material, that responds to the stress by generating a voltage; and
   means for mounting the magnetic field source and the magnetic field sensing element so that the vibrations cause the magnetic field source to move relative to the magnetic field sensing element.

2. The vibrational energy harvester of claim 1 wherein the magnetostrictive material has a magnetization vector that responds to variations in the magnetic field by rotating in a plane and wherein the magnetic field sensing element includes electrodes that measure the voltage generated by the electroactive material in a direction substantially parallel to the plane in which the magnetization vector rotates.

3. The vibrational energy harvester of claim 1 wherein the magnetic field sensing element further comprises a second layer of magnetostrictive material bonded to the layer of electroactive material, the second layer of magnetostrictive material having a magnetization vector that responds to variations in the magnetic field by generating a stress.

4. The vibrational energy harvester of claim 3 further comprising a flux closure yoke comprised of magnetic material that reduces the reluctance of a magnetic circuit between the first and second magnetostrictive layers and spans the electroactive layer.

5. The vibrational energy harvester of claim 3 wherein the magnetic field source comprises a pair of permanent magnets.

6. The vibrational energy harvester of claim 5 further comprising a flux closure yoke comprised of magnetic material that completes a magnetic circuit between the pair of permanent magnets.

7. The vibrational energy harvester of claim 1 wherein the magnetostrictive layer is disk-shaped.

8. The vibrational energy harvester of claim 7 wherein the means for mounting the magnetic field source and the magnetic field sensing element is adapted so that the vibrations cause the magnetic field source to rotate relative to the magnetic field sensing element.

9. The vibrational energy harvester of claim 8 wherein the vibrations can be resolved into orthogonal, linear motions and wherein the vibration energy harvester further comprises an inertial mass attached to one of the magnetic field source and the sensing element causing the magnetic field source and the sensing element to rotate relative to each other in response to the vibrations.

10. The vibrational energy harvester of claim 8 wherein the mounting means is adapted so that both the magnetic field source and the magnetic field sensing element rotate in response to the vibrations.

11. The vibrational energy harvester of claim 1 wherein the magnetic field source comprises a first pole piece and a second pole piece and wherein the magnetic field sensing element is positioned between the first and second pole pieces.

12. The vibrational energy harvester of claim 11 wherein each of the first and second pole pieces comprises a plurality of magnets arranged in opposing flux relationship.

13. The vibrational energy harvester of claim 12 wherein the first and second pole pieces are arranged so that the magnetic flux pattern in the vicinity of the magnetic field sensing element comprises alternating bands of opposite field directions.

14. The vibrational energy harvester of claim 13 wherein multiple field sensing elements are located between the first and second pole pieces.

15. A vibrational energy harvester that converts mechanical vibrations into electrical energy, comprising:

a magnetic field source that generates a magnetic field;

a magnetic field sensing element including a first disk-shaped layer of magnetostrictive material having a magnetization vector that responds to variations in the magnetic field by generating a stress, a layer of electroactive material, mechanically bonded to the first layer of magnetostrictive material, and a second disk-shaped layer of magnetostrictive material bonded to the electroactive material layer and having a magnetization vector that responds to variations in the magnetic field by generating a stress so that the electroactive layer that responds to the stresses generated by the first and second magnetostrictive layers by generating a voltage; and means for mounting the magnetic field source and the magnetic field sensing element so that the vibrations cause the magnetic field source to rotate relative to the magnetic field sensing element.

16. The vibrational energy harvester of claim 15 wherein the electroactive layer is disk-shaped having a first and second planar faces and the first magnetostrictive layer is bonded to the first planar face and the second magnetostrictive layer is bonded to the second planar face.

17. The vibrational energy harvester of claim 16 wherein the first and second planar faces are circular.

18. The vibrational energy harvester of claim 16 wherein the first and second planar faces are elliptical.

19. The vibrational energy harvester of claim 15 wherein the electroactive layer is a rectangular solid having first and second planar faces that are rectangular.

20. The vibrational energy harvester of claim 15 wherein the electroactive layer is disk-shaped with two disk-shaped faces and a cylindrical outer surface and wherein the vibrational energy harvester further comprises a pair of electrodes attached to the cylindrical outer surface.

21. The vibrational energy harvester of claim 20 wherein each electrode has an arc length of between 1/8 and 3/8 of the circumference of the cylindrical outer surface.

* * * * *